Figure 1:
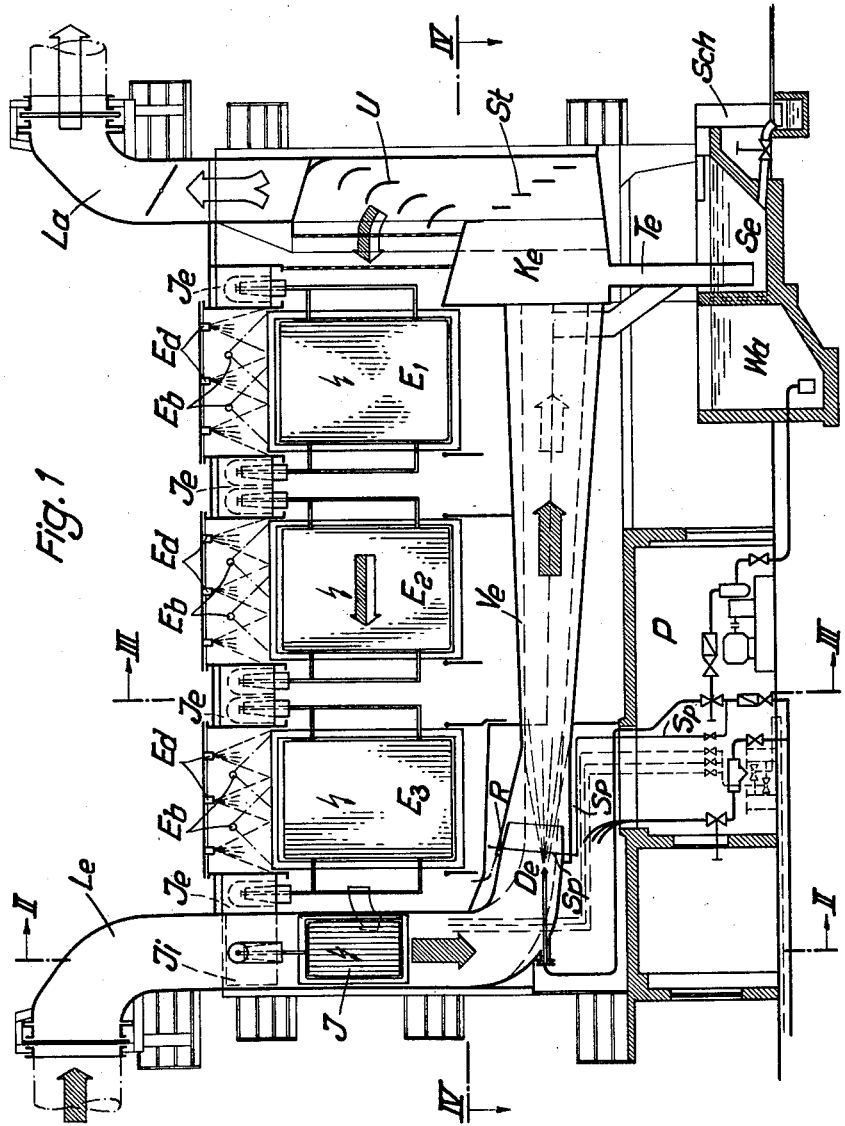

April 17, 1962 J. WIEMER ETAL 3,029,578
ELECTROSTATIC FILTERS
Filed March 9, 1959 5 Sheets-Sheet 1

Inventors
Jean Wiemer
Heinz Muller
By
Bailey, Stephens & Huettig
Attorneys

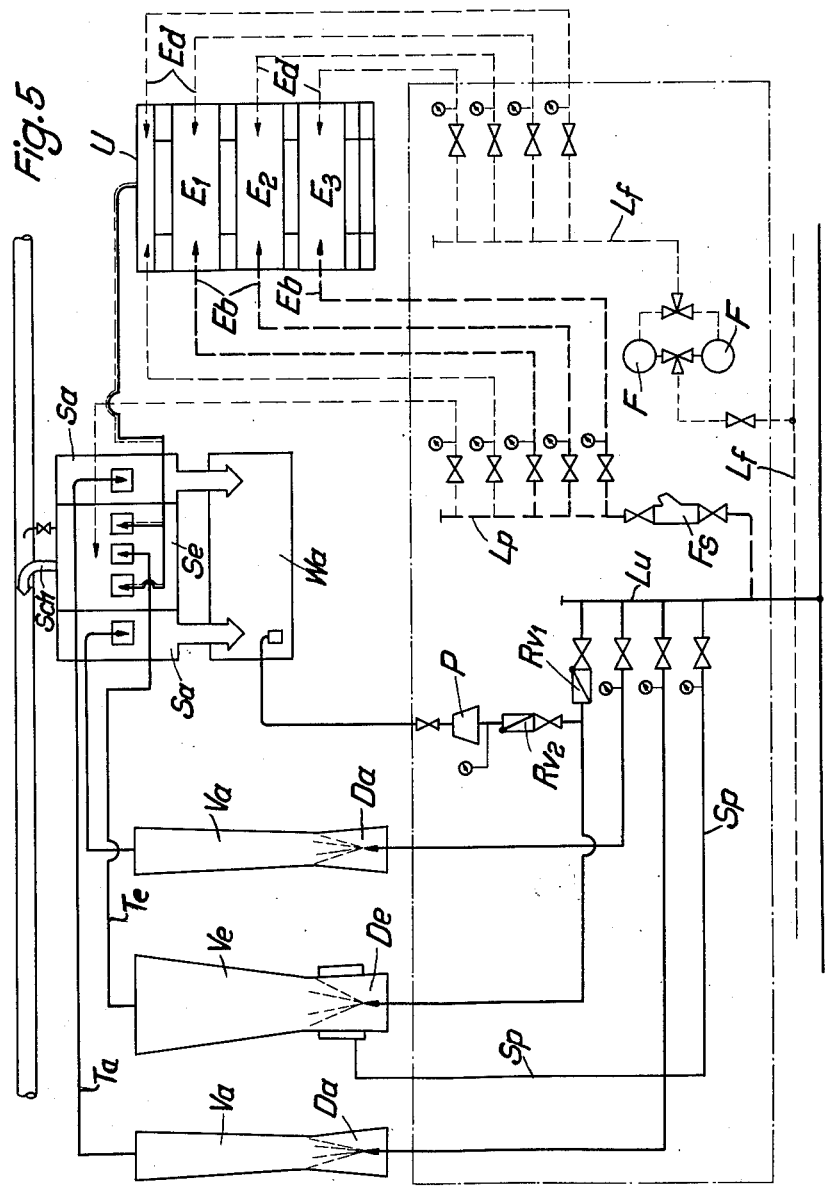

3,029,578
ELECTROSTATIC FILTERS
Jean Wiemer, Oberhochstadt (Taunus), and Heinz Müller, Frankfurt am Main, Germany, assignors to Metallgesellschaft Aktiengesellschaft, Frankfurt am Main, Germany
Filed Mar. 9, 1959, Ser. No. 798,107
Claims priority, application Germany Apr. 24, 1958
1 Claim. (Cl. 55—122)

This invention relates to an electrostatic filter, particularly for cleaning the top gas from blast furnaces, and a method of operating the same.

To permit gases to be satisfactorily cleaned by electrostatic precipitation, and, in some instances to permit this to be done at all, it is often necessary, especially in cleaning blast furnace top gas, to pass the gas through a scrubber in order to cool and moisten the hot gas before it enters the electrostatic filter. In recent years Venturi ducts have been used for pre-cleaning arranged to precede the electrostatic filter. Ionizing of the crude gas before it is scrubbed has been suggested. Vertical scrubbers with a horizontal filter attached at right angles thereto take up considerable space and the interposition of a venturi as a cleaner greatly increases the structural length of the plant.

The present invention has the object of economising space and reducing the structural length of such a plant, while at the same time taking advantage of the pressure rise produced by the injector effect of venturi cleaners (conventional cooling scrubbers produce a pressure drop) to create a pressure gradient inside the casing of the electrostatic filter which, contrary to accepted usage, decreases towards the filter inlet, in such a way that the cleaned gas will be at a higher pressure than the incoming crude gas. This proposal offers advantages because the insulators associated both with the preliminary ioniser and the precipitation sections of the electrostatic filter can then be ventilated with clean gas and more economically heated.

Accordingly, one aspect of the present invention provides a method of operating electrostatic filters following a precleaning stage in a venturi duct preceded by an ionizer, in which an axially arranged pressurized water nozzle which acts as an injector into the venturi cleaner is operated at a pressure, for instance 5 to 6 atmospheres, which will produce a gas pressure at the outlet end of the electrostatic filter which exceeds that existing in the crude gas admission duct, the cleaned gas being then utilized for ventilating the electrical insulators associated with the electrostatic filter and the ionizer without any additional consumption of energy.

According to another aspect of the present invention, there is provided an electrostatic filter preceded by a gas-pre-cleaning stage in a venturi duct (venturi cleaner) (an ionizer for the crude gases preferably preceding the pre-cleaning stage), for performing the method just indicated, in which the venturi cleaner forms part of one of the walls of the casing of the electrostatic filter (in horizontal filters preferably the floor), in such a way that the gas stream emerging from the venturi pre-cleaner must be deflected through 180° before entering the inlet side of the electrostatic filter.

An advantage offered by the invention is the two-stage utilization of the fresh water employed for moistening and cooling the gas for scrubbing the crude gas in the pre-cleaning stage, by first cooling the clean gases which leave the electrostatic filter and then using the still fresh water which has been slightly preheated and still contains a few solids for scrubbing the crude gas.

The invention provides a particularly convenient form of construction of the electrostatic filters, incorporating the preliminary venturi cleaners in the construction of the walls of the electrostatic filter, especially of its floor, more particularly in the case of horizontal electrostatic filters. Such an arrangement according to the invention involves deflecting the gas stream emerging from the venturi cleaner at the inlet end of the electrostatic filter from its original direction of flow through 180°. Advantage is taken of the presence of this point of deflection for the collection of dust and possibly water by the provision of impingement deflectors.

According to another feature of the invention, the stream of clean gas leaving the electrostatic filter may be re-deflected through 180° and again conducted through one or more venturi ducts which serve as cooling and injecting means, said additional venturis being conveniently arranged on the same side of the casing of the electrostatic filter as the venturi pre-cleaner, in such a way that, for instance, one horizontal or vertical wall of the casing is actually formed by three parallel venturi cleaners.

Figure 2:
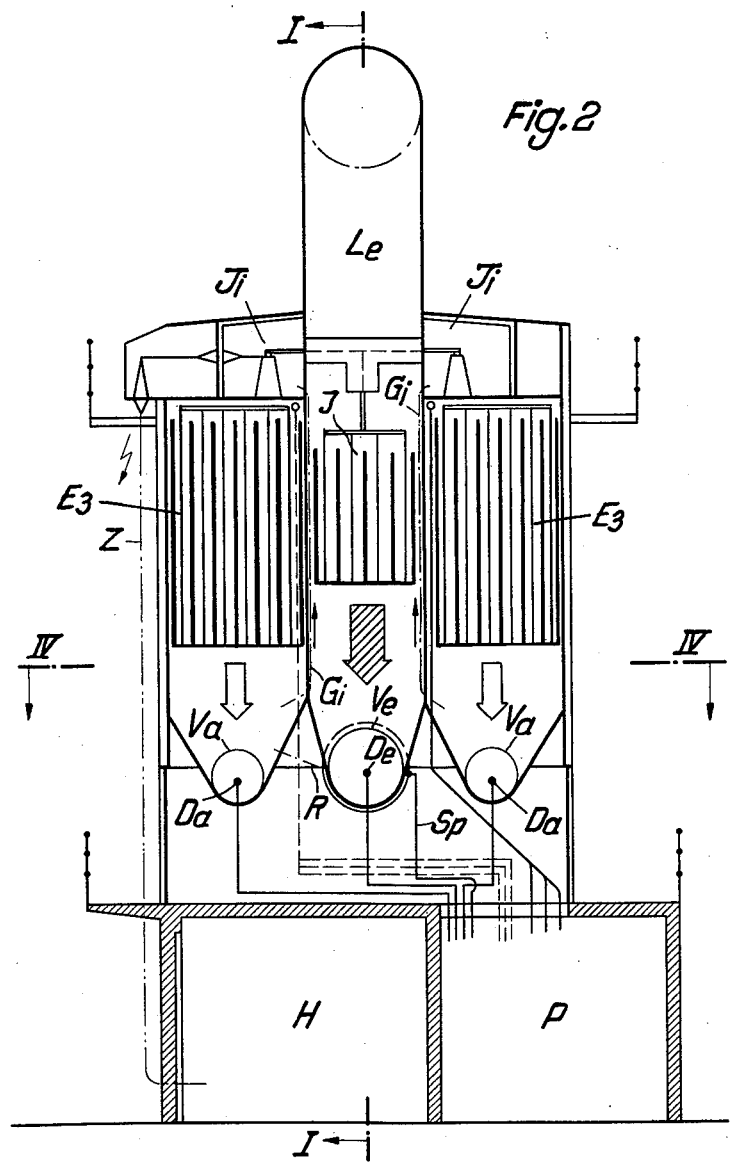
Figure 3:
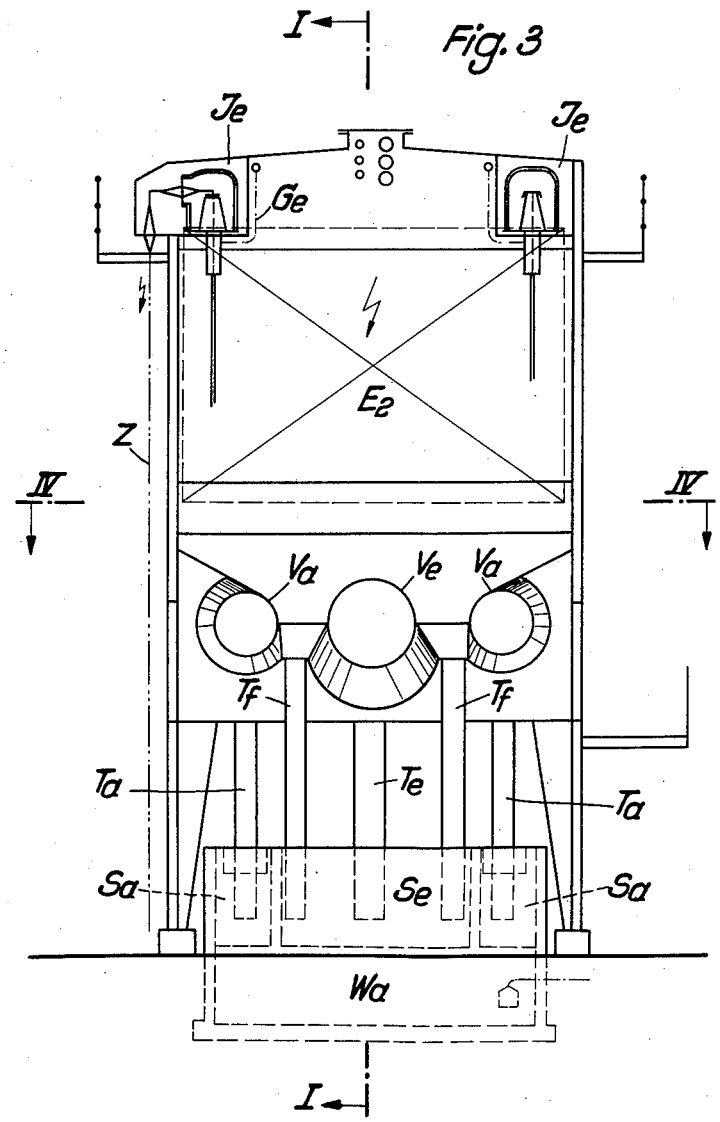
Figure 4:
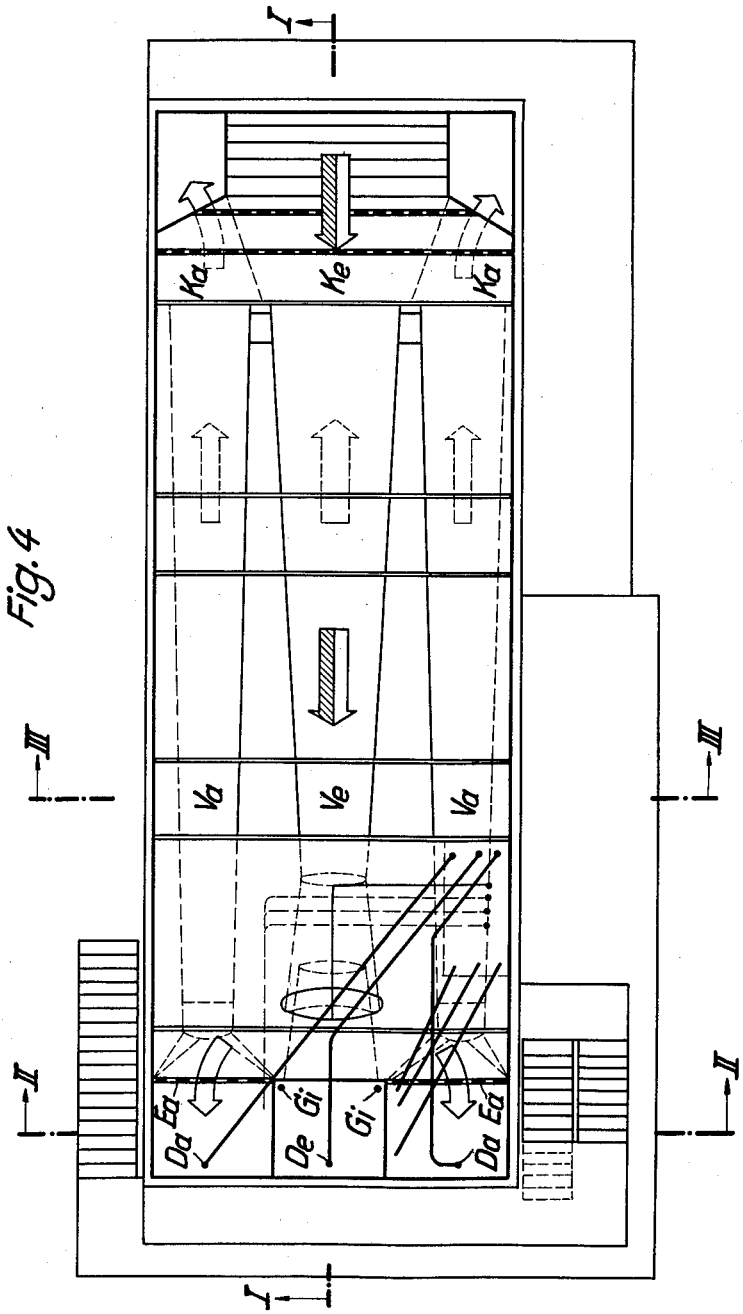

In order to enable the invention to be more readily understood, reference will be made to the accompanying drawings, which illustrate diagrammatically and by way of example an embodiment of the invention in the form of a horizontal electrostatic filter, and in which:

FIG. 1 is a longitudinal section on the line I—I of FIGS. 2 and 3;
FIG. 2 is a cross-section on the line II—II of FIG. 1;
FIG. 3 is a cross-section on the line III—III of FIG. 1;
FIG. 4 is a horizontal section on the line IV—IV of FIG. 1; and
FIG. 5 is a flow diagram.

Referring now to the drawings, a gas inlet duct for the crude (blast furnace) gas is indicated at the top left-hand side of the drawing by L$e$. The duct L$e$ contains a preliminary ionizer J with an insulator chamber J$i$ (FIG. 2) arranged on each side of the ionizer. The path taken by the crude gas is represented by the hatched arrows. From the admission duct L$e$, the gases enter a venturi duce V$e$ which forms part of the floor of the horizontal electrostatic filter comprising, for instance, three precipitator sections E$_1$, E$_2$, and E$_3$ located above the venturi V$e$. At the inlet end of the venturi V$e$ is a pressurized water injector D$e$ operating at a pressure of, say, 5 atmospheres, an annular chamber R being formed around the venturi inlet, at the outlet of the duct L$e$, to provide space for the introduction of additional water pipes for flushing the venturi throat from the upstream side, and for the provision, if desired, of a gas duct communicating with the outlet end of the electrostatic filter, which is located immediately above the inlet of the venturi cleaner V$e$ (to permit clean gas to be drawn into the annular chamber R if desired). At the outlet end of the venturi cleaner V$e$, which slopes downwards from the inlet to its outlet, is an enlarged channel or chamber K$e$ containing impingement plates S$t$ for the interception of dust and water and for the deflection of the gas stream in co-operation with deflectors U through 180° into the electrostatic filters $E_1$, $E_2$, and $E_3$. The sludge accumulating in the preliminary collecting chamber $Ke$ is discharged through a down-pipe $Te$ into a sump $Se$ from which it reaches a well $Sch$ over a spillway.

The gases, which have thus been partly cleaned and which are charged with water vapor to the saturation point, now pass through the electrostatic precipitators $E_1$ to $E_3$ of the filter in the opposite direction of the flow, that is, from right to left (partly hatched arrows). Upon leaving the electrostatic filter $E_3$ they may again be deflected through 180°, as indicated by the white arrows, and, if desired, passed from left to right, as shown in FIG. 2, through two smaller venturi cleaners or coolers $Va$ located beneath the horizontal filter.

It will therefore be seen that all the venturi cleaners are located, with a downward gradient, side by side at the bottom of the horizontal electrostatic filter (in a vertical filter they would be situated on one side). As shown in the plan view of the plant of FIG. 4, the venture after-cleaners $Va$, which are flushed in the same way as venturi $Ve$, discharge into enlarged channels or chambers $Ka$ (which discharge through passages $Ta$) on either side of the channel $Ke$, from which the clean gases rise into a clean air duct $La$ which is shown in FIG. 1.

Because the gases which are to be cleaned are deflected at least once through 180°, the invention makes it possible to construct a very compact electrostatic filter block which is considerably shorter in overall structural length as well as appreciably lighter than the conventional plants.

The axial arrangement of the pressurized water injectors $De$ for the venturi pre-cleaner $Ve$, and $Da$ for the venturi fater-cleaners $Va$ (FIG. 4) on the lefthand side of the electrostatic filter casing allows a pump chamber $P$ (FIG. 1) to be located in the space underneath the electrostatic filter. Moreover, apart from the sump $Se$, which has already been mentioned, additional sumps $Sa$ for the reception of the used water from the venturi after-cleaners $Va$ are arranged on either side of sump $Se$ underneath the electrostatic filter casing.

Since, according to another feature of the invention, these venturi after-cleaners $Va$ are supplied with fresh water first and serve principally for reducing the temperature of the clean gases to about 5 to 8° C. below the dew point of the crude gas entering the preliminary venturi cleaner, say from 50° to 35° C., and since this cooling water is therefore still substantially clean, it can be led to a common water tank $Wa$ (FIGS. 1 and 3) and fed from this tank without previous special clarification straight to the pressurized water injector $De$ of the preliminary venturi cleaner $Ve$. The manner in which the water is thus used in two stages is very practical, especially as the water for the preliminary venturi cleaner $Ve$ will thus incidentally be preheated in a manner that is wholly desirable. It is advisable to operate the pressurizing pumps for the after-cleaners $Va$ at a lower pressure (say 4 atmospheres) than the pump which supplies the preliminary cleaner $Ve$ and to include a non-return valve in an intercommunicating pipe between the pressurized water supply pipes for the venturi cleaners $Ve$ and $Va$, so that, in the event of failure of the higher pressure pump, water from the lower pressure pump will be automatically supplied to the preliminary cleaner (FIG. 5).

As is schematically indicated in the section shown in FIG. 2, gas pipes $Gi$ may be branched off from the clean gas outlet of the electrostatic filter at the entry into the venturi after-cleaners $Va$ for ventilaitng and heating insulator chamber $Ji$, because the employment of venturi ducts causes a continuous increase in pressure through the circulating system of the crude and clean gas. Gauge pressure is therefore always available for clean gas to be piped off for the ventilation of the insulator chamber of the ionizer and the electrostatic filter (each electrostatic precipitator). These gas pipes are indicated in FIG. 3 at $Ge$, and communicate with the conductor conduits which in turn communicate with the insulator chambers.

FIG. 5 illustrates the water circulating system in diagrammatic form. $Lf$ is the fresh water supply for continuously spraying the electrostatic precipitators $E_1$, $E_2$, $E_3$ and possibly also the deflector vanes $U$, through pipes $Ed$. Preferably two additional filters $F$ are included in the fresh water supply pipe $Lf$. $Lu$ is the feed pipe for the water circulating system incorporating the venturi injectors $Da$ and $De$, whereas $Lp$ is a further branch pipe from the feed pipe $Lu$ for periodically flushing the electrostatic filter via pipes $Eb$. The pipes $Eb$ may communicate with further pipes for the deflector vanes $U$ and the settling tank $Se$, for instance for flushing out the sludge that may have been deposited therein. Another branch pipe $Sp$ from the pipe $Lu$ leads into the annular chamber $R$ (FIG. 1) which surrounds the inlet to the preliminary venturi cleaner $Ve$ and serves for dislodging dust that may be deposited in this space. The water drained from the preliminary venturi cleaner $Ve$ is discharged into the tank $Se$ and thence flows over a spillway and through the well $Sch$ into the waste water drains. The water discharged from the venturi after-cleaners $Va$ flows into the sumps $Sa$ and thence to a collecting tank $Wa$ whence it is pumped by pumps $P$ through a non-return valve $Rv_2$ back to the preliminary venturi cleaner $Ve$. A second non-return valve $Rv_1$ is included in the supply pipe to the injector $De$ to permit water from the circulating pipe $Lu$ to be automatically fed to the preliminary cleaner. To provide this automatic regulation the pumps $P$ must operate at a higher pressure than the pumps (not shown) for supplying the circulating pipe $Lu$.

The compact block-type construction of the electrostatic filter also permits all flushing and injector or sprayer pipes to be located inside the casing so that in winter there is no risk of the pipes, flaps, or valves, freezing.

Compared with the known zone injection cooler which consumes about 5 cubic metres of water per 1000 standard cubic metres of gas, the venturi coolers require only 3 cub. metres of water per 1000 standard cub. metres of gas at approximately the same water pressures. Moreover, the venturi cleaners provide a gain in gas pressure of about 20 mm. water column, whereas the zonal injection cooler gives a pressure loss of 20 mm. water column.

The dust separation efficiency of the preliminary venturi cleaner $Ve$ preceded by an ionizer $J$ is approximately 90% for blast furnace top gas, so that the crude gas entering the electrostatic filter has already been cleaned to a residual dust content of between 0.8 to 0.5 g./standard cub. metre gas. Assuming a dust collection efficiency of at least 90% of the electrostatic filter and a further 30% dust removal in the venturi after-cleaner $Va$, residual dust contents of less than 10 to 5 milligrammes per standard cub. metre of gas can be guaranteed.

While we have described herein one embodiment of our invention, we wish it to be understood that we do not intend to limit ourselves thereby except within the scope of the claim hereto or hereinafter appended.

We claim:

In combination with an electrical precipitator, a venturi gas ejector preceding said electrical precipitator and another venturi gas ejector following said electrical precipitator, the axes of said gas ejectors being horizontal, a casing common to said preceding and following venturi gas ejectors and enclosing said electrical precipitator, said venturi gas ejectors being arranged side by side below the electrical precipitator with parts of the walls of the gas ejectors forming a part of the bottom wall of the casing, means to inject into said preceding and following venturi gas ejectors a liquid cooling and cleaning medium, means to separate and withdraw said cooling and cleaning medium from the gas after leaving each said venturi gas ejector, and means connected to the casing adjacent the outlet ends of the ejectors to withdraw said liquid cooling and cleaning medium from said common casing, said casing including means at the outlet of the preceding gas ejector and at the inlet of the following gas ejector to turn the gas through 180° between each of the gas ejectors and the electrical precipitator.

References Cited in the file of this patent

UNITED STATES PATENTS

| | | |
|---|---|---|
| 1,119,469 | Strong et al. | Dec. 1, 1914 |
| 1,728,130 | Mathesius | Sept. 10, 1929 |
| 1,905,993 | Buff | Apr. 25, 1933 |
| 2,273,194 | Hedberg et al. | Feb. 17, 1942 |
| 2,667,941 | Ekstrom | Feb. 2, 1954 |
| 2,723,842 | Hall | Nov. 15, 1955 |
| 2,841,242 | Hall | July 1, 1958 |
| 2,949,168 | Peterson | Aug. 16, 1960 |

FOREIGN PATENTS

| | | |
|---|---|---|
| 27,097 | Netherlands | June 14, 1928 |
| 338,827 | Great Britain | Nov. 27, 1930 |
| 419,610 | Great Britain | Nov. 15, 1934 |
| 786,313 | Great Britain | Nov. 13, 1957 |